US007765181B2

(12) United States Patent
Thomas et al.

(10) Patent No.: US 7,765,181 B2
(45) Date of Patent: Jul. 27, 2010

(54) WEB-BASED ASSET MANAGEMENT

(76) Inventors: Shawn Thomas, 311 W. 5th St., #903, Austin, TX (US) 78701; Gregory Gray, 311 W. 5th St., #905, Austin, TX (US) 78701; Michael Woodfin, 7610 Dallas Dr., Austin, TX (US) 78729; Warner Mizell, 3007 Rivercrest Dr., Austin, TX (US) 78746; Brian Thomas, 13314 Council Bluff Dr., Austin, TX (US) 78727

( * ) Notice: Subject to any disclaimer, the term of this patent is extended or adjusted under 35 U.S.C. 154(b) by 456 days.

(21) Appl. No.: 10/464,176

(22) Filed: Jun. 18, 2003

(65) Prior Publication Data
US 2003/0217042 A1 Nov. 20, 2003

Related U.S. Application Data

(63) Continuation of application No. 10/321,115, filed on Dec. 17, 2002, now Pat. No. 6,636,857.

(60) Provisional application No. 60/342,031, filed on Dec. 18, 2001.

(51) Int. Cl.
*G06F 17/30* (2006.01)
(52) U.S. Cl. .................. 707/104.1; 707/10; 715/234
(58) Field of Classification Search .............. 717/176, 717/132, 173, 121; 707/10, 100, 104.1, 103 R; 707/203; 709/220, 216, 221, 245; 714/31; 711/173; 137/1; 713/182, 200; 705/26, 705/28; 715/200, 234
See application file for complete search history.

(56) References Cited

U.S. PATENT DOCUMENTS 4,558,413 A * 12/1985 Schmidt et al. ............. 707/203

4,653,112 A 3/1987 Ouimette
4,695,946 A * 9/1987 Andreasen et al. ............ 714/31
4,714,995 A * 12/1987 Materna et al. ............. 707/201
5,005,122 A * 4/1991 Griffin et al. ............... 709/203

(Continued)

FOREIGN PATENT DOCUMENTS

CN 1204410 1/1999

(Continued)

OTHER PUBLICATIONS

PowerQuest Corporation, "PowerQuest Drive Image Professional V.2 User Guide," 1998, PowerQuest Corporation, Guide p. xvii, pp. 15-44; Supplement p. 1.*

(Continued)

*Primary Examiner*—Shahid A Alam

(57) ABSTRACT

The method and system of the present invention provides an improved technique for replacing, implementing and managing computer-related assets. A technician accesses the World Wide Web through a user's computer. The information resident on the computer, including information regarding the computer and the user's preferences, are downloaded to a remote storage medium through the World Wide Web. Once downloaded, all information may be removed from the user's computer. Subsequently, the technician accesses another computer such as, for example, a new computer that has been assigned to the same user. The technician accesses the World Wide Web through the new computer and downloads the information previously stored on the remote storage medium. This information can then be used to install the user's prior applications, settings and preferences on the new computer.

13 Claims, 8 Drawing Sheets

U.S. PATENT DOCUMENTS

| | | | |
|---|---|---|---|
| 5,019,963 A * | 5/1991 | Alderson et al. ............. 707/201 |
| 5,133,075 A * | 7/1992 | Risch ......................... 707/201 |
| 5,155,847 A * | 10/1992 | Kirouac et al. .............. 709/221 |
| 5,249,290 A * | 9/1993 | Heizer ........................ 718/105 |
| 5,278,982 A | 1/1994 | Daniels |
| 5,339,176 A | 8/1994 | Smilansky et al. |
| 5,355,498 A | 10/1994 | Provino |
| 5,414,843 A | 5/1995 | Nakamura et al. |
| 5,586,322 A | 12/1996 | Beck et al. ................... 395/616 |
| 5,673,382 A | 9/1997 | Cannon |
| 5,678,002 A | 10/1997 | Fawcett et al. |
| 5,752,244 A | 5/1998 | Rose et al. |
| 5,778,395 A | 7/1998 | Whiting et al. ............. 707/204 |
| 5,783,951 A | 7/1998 | Stein et al. |
| 5,784,578 A | 7/1998 | Galloway |
| 5,787,234 A | 7/1998 | Molloy |
| 5,787,491 A * | 7/1998 | Merkin et al. ................ 711/173 |
| 5,793,951 A | 8/1998 | Stein et al. ............. 395/187.01 |
| 5,799,147 A | 8/1998 | Shannon |
| 5,819,020 A | 10/1998 | Beeler |
| 5,852,811 A | 12/1998 | Atkins |
| 5,864,828 A | 1/1999 | Atkins |
| 5,881,285 A | 3/1999 | DeLeeuw |
| 5,884,285 A | 3/1999 | Atkins |
| 5,893,904 A | 4/1999 | Harris et al. |
| 5,893,906 A | 4/1999 | Daffin et al. |
| 5,909,669 A | 6/1999 | Havens |
| 5,911,135 A | 6/1999 | Atkins |
| 5,911,136 A | 6/1999 | Atkins |
| 5,920,700 A * | 7/1999 | Gordon et al. .............. 709/226 |
| 5,923,850 A | 7/1999 | Barroux |
| 5,930,342 A | 7/1999 | Mazzapica |
| 5,959,275 A | 9/1999 | Hughes et al. |
| 5,974,536 A | 10/1999 | Richardson |
| 5,974,563 A | 10/1999 | Beeler, Jr. |
| 6,016,500 A | 1/2000 | Waldo et al. |
| 6,026,500 A | 2/2000 | Topff et al. |
| 6,038,551 A | 3/2000 | Barlow et al. |
| 6,038,665 A | 3/2000 | Bolt et al. ................... 713/176 |
| 6,049,784 A | 4/2000 | Weatherly et al. |
| 6,052,694 A | 4/2000 | Bromberg |
| 6,108,641 A | 8/2000 | Kenna et al. |
| 6,110,229 A | 8/2000 | Yamaguchi |
| 6,118,447 A | 9/2000 | Harel |
| 6,127,661 A | 10/2000 | Flangin et al. |
| 6,128,661 A | 10/2000 | Flanagin et al. ............. 709/227 |
| 6,145,126 A * | 11/2000 | Matsukura et al. .......... 717/173 |
| 6,161,176 A | 12/2000 | Hunter et al. ................. 713/1 |
| 6,181,336 B1 | 1/2001 | Chiu et al. |
| 6,182,212 B1 | 1/2001 | Atkins |
| 6,182,226 B1 * | 1/2001 | Reid et al. .................... 726/15 |
| 6,185,576 B1 | 2/2001 | McIntosh |
| 6,189,008 B1 | 2/2001 | Easty et al. |
| 6,212,280 B1 | 4/2001 | Howard et al. |
| 6,220,768 B1 | 4/2001 | Barroux |
| 6,230,287 B1 | 5/2001 | Pinard et al. |
| 6,237,009 B1 | 5/2001 | Waldo et al. |
| 6,237,617 B1 * | 5/2001 | Sturman et al. ................ 137/1 |
| 6,252,694 B1 | 6/2001 | Shinada |
| 6,256,773 B1 * | 7/2001 | Bowman-Amuah ......... 717/121 |
| 6,266,774 B1 | 7/2001 | Sampath |
| 6,281,894 B1 | 8/2001 | Rive |
| 6,289,378 B1 | 9/2001 | Meyer et al. |
| 6,327,579 B1 | 12/2001 | Crawford |
| 6,327,617 B1 | 12/2001 | Fawcett ....................... 709/219 |
| 6,330,566 B1 | 12/2001 | Durham ...................... 707/104 |
| 6,351,776 B1 * | 2/2002 | O'Brien et al. ............. 709/245 |
| 6,363,498 B1 | 3/2002 | Howell |
| 6,363,499 B1 | 3/2002 | Delo |
| 6,366,916 B1 | 4/2002 | Baer |
| 6,370,646 B1 | 4/2002 | Goodman |
| 6,373,416 B1 | 4/2002 | McGrath et al. |
| 6,373,434 B1 | 4/2002 | Hayakawa |
| 6,374,263 B1 | 4/2002 | Bunger et al. |
| 6,381,644 B2 | 4/2002 | Munguia et al. |
| 6,385,621 B1 | 5/2002 | Frisina |
| 6,385,707 B1 | 5/2002 | Maffezzoni |
| 6,411,936 B1 | 6/2002 | Sanders |
| 6,438,749 B1 | 8/2002 | Chamberlain |
| 6,473,794 B1 * | 10/2002 | Guheen et al. .............. 709/223 |
| 6,490,587 B2 | 12/2002 | Easty |
| 6,499,049 B2 | 12/2002 | Waldo et al. |
| 6,502,096 B1 | 12/2002 | Siefert |
| 6,519,600 B1 | 2/2003 | Seifert |
| 6,532,543 B1 | 3/2003 | Smith |
| 6,557,008 B1 | 4/2003 | Temple, III et al. |
| 6,571,276 B1 | 5/2003 | Burns et al. |
| 6,574,522 B1 | 6/2003 | Douglas |
| 6,574,617 B1 * | 6/2003 | Immerman et al. ............. 707/1 |
| 6,609,090 B1 | 8/2003 | Hickman et al. |
| 6,625,622 B1 | 9/2003 | Henrickson |
| 6,633,977 B1 | 10/2003 | Hamilton, II et al. ........ 713/110 |
| 6,636,857 B2 * | 10/2003 | Thomas et al. ................ 707/10 |
| 6,650,622 B1 | 11/2003 | Austerman |
| 6,651,050 B2 | 11/2003 | Shafrir et al. |
| 6,654,802 B1 | 11/2003 | Oliva |
| 6,662,357 B1 * | 12/2003 | Bowman-Amuah ......... 717/120 |
| 6,691,064 B2 | 2/2004 | Vroman |
| 6,732,278 B2 * | 5/2004 | Baird et al. ..................... 726/7 |
| 6,782,394 B1 | 8/2004 | Landeck et al. |
| 6,829,734 B1 | 12/2004 | Kreulen et al. |
| 6,871,322 B2 | 3/2005 | Gusler et al. |
| 6,873,988 B2 * | 3/2005 | Herrmann et al. ............. 707/10 |
| 6,882,961 B2 | 4/2005 | Cobble et al. |
| 7,080,372 B1 * | 7/2006 | Cole ........................... 717/173 |
| 7,110,353 B1 * | 9/2006 | Deschaine et al. ........... 370/219 |
| 7,467,198 B2 * | 12/2008 | Goodman et al. ........... 709/223 |
| 2001/0007128 A1 * | 7/2001 | Lambert et al. .............. 713/165 |
| 2001/0012337 A1 | 8/2001 | Horie et al. |
| 2001/0026619 A1 | 10/2001 | Howard, Jr. et al. |
| 2001/0029474 A1 | 10/2001 | Yada |
| 2001/0037333 A1 | 11/2001 | Nishimura |
| 2001/0052013 A1 | 12/2001 | Munguia |
| 2002/0010808 A1 | 1/2002 | Wiggins |
| 2002/0010863 A1 | 1/2002 | Mankefors |
| 2002/0013807 A1 * | 1/2002 | Richard ....................... 709/202 |
| 2002/0038267 A1 * | 3/2002 | Can et al. ...................... 705/28 |
| 2002/0064736 A1 | 5/2002 | Willner et al. |
| 2002/0065736 A1 * | 5/2002 | Willner et al. ................. 705/26 |
| 2002/0065825 A1 | 5/2002 | Kassan |
| 2002/0073114 A1 * | 6/2002 | Nicastro et al. ............. 707/500 |
| 2002/0082966 A1 | 6/2002 | O'Brien et al. |
| 2002/0082997 A1 | 6/2002 | Kobata et al. |
| 2002/0083102 A1 | 6/2002 | Vetter |
| 2002/0091699 A1 | 7/2002 | Norton |
| 2002/0091975 A1 * | 7/2002 | Redlich et al. ............ 707/104.1 |
| 2002/0099934 A1 | 7/2002 | Cromer |
| 2002/0103806 A1 * | 8/2002 | Yamanoue ................... 707/100 |
| 2002/0104080 A1 | 8/2002 | Woodard |
| 2002/0123983 A1 | 9/2002 | Riley et al. |
| 2002/0143421 A1 | 10/2002 | Wetzer |
| 2002/0143598 A1 | 10/2002 | Scheer |
| 2002/0143775 A1 | 10/2002 | Wilkinson |
| 2002/0143782 A1 | 10/2002 | Headings et al. |
| 2002/0147601 A1 | 10/2002 | Fagan |
| 2002/0152151 A1 | 10/2002 | Baughman et al. |
| 2002/0152229 A1 * | 10/2002 | Peng .......................... 707/203 |
| 2002/0161600 A1 | 10/2002 | Stubiger et al. |
| 2002/0169714 A1 | 11/2002 | Ike et al. |
| 2002/0184619 A1 * | 12/2002 | Meyerson ................... 717/173 |
| 2002/0184652 A1 * | 12/2002 | Cezeaux ..................... 725/132 |
| 2002/0194194 A1 | 12/2002 | Fenton et al. |
| 2002/0198997 A1 | 12/2002 | Linthicum |
| 2003/0004925 A1 | 1/2003 | Knoblock et al. |

| | | | |
|---|---|---|---|
| 2003/0009455 A1 | 1/2003 | Carlson | |
| 2003/0009540 A1* | 1/2003 | Benfield et al. | 709/220 |
| 2003/0014508 A1 | 1/2003 | Cheston et al. | |
| 2003/0018746 A1 | 1/2003 | Boesch | 709/218 |
| 2003/0046371 A1* | 3/2003 | Falkner | 709/220 |
| 2003/0055749 A1 | 3/2003 | Carmody et al. | |
| 2003/0056140 A1 | 3/2003 | Taylor et al. | |
| 2003/0061159 A1 | 3/2003 | Adams et al. | |
| 2003/0079132 A1* | 4/2003 | Bryant | 713/182 |
| 2003/0084067 A1 | 5/2003 | Obiaya | |
| 2003/0084460 A1 | 5/2003 | Chung | |
| 2003/0093521 A1 | 5/2003 | Schlonski | |
| 2003/0093688 A1* | 5/2003 | Helgesen et al. | 713/200 |
| 2003/0110169 A1 | 6/2003 | Zuili | |
| 2003/0120677 A1 | 6/2003 | Vernon | |
| 2003/0120684 A1 | 6/2003 | Zuili | |
| 2003/0126047 A1 | 7/2003 | Hollar | |
| 2003/0126048 A1 | 7/2003 | Hollar | |
| 2003/0130820 A1 | 7/2003 | Lane, III | |
| 2003/0139985 A1 | 7/2003 | Hollar et al. | |
| 2003/0140031 A1 | 7/2003 | Thomas et al. | |
| 2003/0140046 A1* | 7/2003 | Thomas et al. | 707/10 |
| 2003/0140052 A1 | 7/2003 | Thomas et al. | |
| 2003/0140057 A1 | 7/2003 | Thomas et al. | |
| 2003/0140150 A1 | 7/2003 | Kemp | |
| 2003/0154199 A1 | 8/2003 | Thomas | |
| 2003/0167323 A1 | 9/2003 | Motoyama | |
| 2003/0172020 A1 | 9/2003 | Davies et al. | |
| 2003/0182211 A1 | 9/2003 | Sakurazawa et al. | |
| 2003/0187758 A1 | 10/2003 | McKalko | |
| 2003/0195764 A1 | 10/2003 | Baker et al. | |
| 2003/0200274 A1 | 10/2003 | Henrickson | |
| 2003/0200299 A1 | 10/2003 | Jamison, III | |
| 2003/0200304 A1 | 10/2003 | Thorpe et al. | |
| 2003/0216976 A1 | 11/2003 | Ehrman et al. | |
| 2003/0217042 A1 | 11/2003 | Thomas | |
| 2003/0217062 A1 | 11/2003 | Thomas | |
| 2003/0225707 A1 | 12/2003 | Ehrman et al. | |
| 2003/0225927 A1 | 12/2003 | Goodman | |
| 2003/0233287 A1 | 12/2003 | Sadler et al. | |
| 2003/0237022 A1 | 12/2003 | Thayer | |
| 2004/0001088 A1 | 1/2004 | Stancil | |
| 2004/0012808 A1 | 1/2004 | Payne et al. | |
| 2004/0024657 A1 | 2/2004 | Wright et al. | |
| 2004/0044688 A1 | 3/2004 | Brudz | |
| 2004/0049578 A1 | 3/2004 | Ohara | |
| 2004/0143428 A1 | 7/2004 | Rappaport et al. | |
| 2005/0114468 A1 | 5/2005 | Philyaw | |

FOREIGN PATENT DOCUMENTS

| | | |
|---|---|---|
| EP | 0836140 | 4/1998 |
| EP | 0881567 | 12/1998 |
| EP | 1197886 | 4/2002 |
| EP | 1255196 | 6/2002 |
| EP | 1251656 | 10/2002 |
| EP | 1255196 | 11/2002 |
| GB | 2340273 | 2/2000 |
| GB | 2340273 A | 2/2000 |
| JP | 03173273 | 6/2003 |
| WO | WO-9812656 | 3/1998 |
| WO | WO-9853396 | 11/1998 |
| WO | WO-PCT/AU97/00594 | 4/1999 |
| WO | WO-0065438 | 11/2000 |
| WO | WO-0068816 | 11/2000 |
| WO | WO-PCT/US00/11140 | 11/2000 |
| WO | WO-PCT/US00/12806 | 11/2000 |
| WO | WO-0131482 | 5/2001 |
| WO | WO-0131494 | 5/2001 |
| WO | WO-0139030 | 5/2001 |
| WO | WO-PCT/US00/29146 | 5/2001 |
| WO | WO-0184274 | 11/2001 |
| WO | WO-0184278 | 11/2001 |
| WO | WO-0221274 | 3/2002 |
| WO | WO-PCT/US01/16629 | 3/2002 |
| WO | WO-0233631 | 4/2002 |
| WO | WO-02077764 | 10/2002 |
| WO | WO-02103548 | 12/2002 |
| WO | WO-03003163 | 1/2003 |
| WO | WO-PCT/US02/20487 | 1/2003 |
| WO | WO-PCT/US02/40817 | 1/2003 |
| WO | WO-PCT/US02/40820 | 2/2003 |
| WO | WO-03029922 | 4/2003 |
| WO | WO-03044718 | 5/2003 |
| WO | WO 03/052558 A2 * | 6/2003 |
| WO | WO-03046681 | 6/2003 |
| WO | WO-03052558 | 6/2003 |
| WO | WO-03052601 | 6/2003 |
| WO | WO-PCT/US02/40816 | 6/2003 |
| WO | WO-03096179 | 11/2003 |
| WO | WO-03002555 | 12/2003 |
| WO | WO-PCT/IB03/002555 | 12/2003 |

OTHER PUBLICATIONS

Lubanski, Mike, and Darshan Doshi, "SMS 2 Administration," 2000, New Riders Publishing, Chapter 1.*

Microsoft Corporation, "The Windows Interface, an Application Design Guide," 1991, Microsoft Press, p. 4.*

Codd, E. F. "A Relational Model of Data for Large Shared Data Banks," originally published in CACM, Jun. 1970, republished in "Readings in Database Systems," 3$^{rd}$ Edition edited by Michael Stonebraker and Joseph M. Hellerstein, 1998, pp. 5-15.*

Stephen Blott Lukas Relly Hans-Jorg Schek, Institute for Information Systems, "An Open Abstract-Object Storage System" SIGMOD, Montreal, Canada, 1996.

John Gaffney, Illustra Information Technologies, Inc., "An Illustra Technical White Paper", Oakland, CA, Mar. 1996.

Emma Stroud, Internet World, "Managing Your Assets", May 1, 2001.

digital-assets.net, "TransLink", Fall of 1995.

ASAP Software, "Intelligent Asset Management".

OPTO 22, Snap-It "Effectively Managing Real-World Assets From IT", Temecula, CA, 2000.

Unicenter IT Resource Management-CA Solutions, "Your Complete Life Cycle Management Solution for Managing On-Demand Computing", May 2002.

"Foreign Office Action", Application Serial No. 02827159.9, (Apr. 24, 2009),10 pages.

"PCT International Preliminary Examination Report", Application No. PCT/US02/40820, 1 pages.

Oppliger, R "Security at the Internet Layer", Retrieved from <http://ieexplore.ieee.org>, Federal Office of Information technology and Systems vol. 31, Issue 9, (Sep. 1998),pp. 43-47.

Aguilar, Rautert "Business Process Simulation", *A Fundamental Step Supporting Process Centered Management*, (1999),pp. 1383-1392.

"Patent Abstracts of Japan", Patent No. 03173273, (Jun. 26, 1991).

"International Search Report", PCT/US02/40601, (Nov. 24, 2003).

"PCT International Preliminary Examination Report", PCT/US02/40601, (Apr. 26, 2004).

"Final Office Action", U.S. Appl. No. 10/321,037, (Dec. 27, 2007),8 pages.

"Non-Final Office Action", U.S. Appl. No. 10/321,037, (Sep. 19, 2007), 5 pages.

"Non-Final Office Action", U.S. Appl. No. 10/321,037, (Jan. 5, 2007), 7 pages.

"Advisory Action", U.S. Appl. No. 10/321,037, (Sep. 8, 2006),3 pages.

"Final Office Action", U.S. Appl. No. 10/321,037, (May 10, 2006), 7 pages.

"Non-Final Office action", U.S. Appl. No. 10/321,037, (May 18, 2005),6 pages.

"Final Office Action", U.S. Appl. No. 10/321,107, (Nov. 21, 2008), 10 pages.

"Non-Final Office Action", U.S. Appl. No. 10/321,107, (Mar. 24, 2006),7 pages.

"Advisory Action", U.S. Appl. No. 10/321,036, (Oct. 17, 2006),3 pages.

"Final Office Action", U.S. Appl. No. 10/321,036, (Jul. 28, 2006), 12 pages.

"Non Final Office Action", U.S. Appl. No. 10/321,036, (Feb. 10, 2006), 11 pages.

"Non-Final Office Action", U.S. Appl. No. 10/321,036, (Sep. 15, 2005), 10 pages.

"Final Office Action", U.S. Appl. No. 10/321,117, (Mar. 23, 2007).

"Non-Final Office Action", U.S. Appl. No. 10/321,117, (Oct. 2, 2006),9 pages.

"Final Office Action", U.S. Appl. No. 10/321,117, (Jan. 9, 2006),8 pages.

"Non-Final Office Action", U.S. Appl. No. 10/321,117, (Aug. 02, 2005),7 pages.

"Non-Final Office Action", U.S. Appl. No. 10/321,118, (Jul. 26, 2006),8 pages.

"Foreign Notice of Rejection", Application Serial No. 02825256.X, (Feb. 13, 2009), 10 pages.

"Non-Final Office Action", U.S. Appl. No. 10/321,107, (Mar. 17, 2009),11 pages.

"Final Office Action", U.S. Appl. No. 10/321,107, (Sep. 4, 2009), 11 pages.

"Non Final Office Action", U.S. Appl. No. 12/056,969, (Aug. 25, 2009), 16 pages.

"Foreign Office Action", Chinese Application No. 02825544.5, (Oct. 9, 2009), 10 Pages.

"Advisory Action", U.S. Appl. No. 10/321,107, (Dec. 1, 2009), 2 pages.

"Non-Final Office Action", U.S. Appl. No. 10/321,107, (Jan. 22, 2010), 10 pages.

"Foreign Office Action", Chinese Application No. 02827159.9, (Jan. 29, 2010), 14 pages.

"Foreign Office Action", Chinese Application No. 02825544.5, (Jan. 22, 2010), 11 pages.

"Non-Final Office Action", U.S. Appl. No. 12/056,969, (Feb. 22, 2010), 13 pages.

* cited by examiner

PRIOR ART
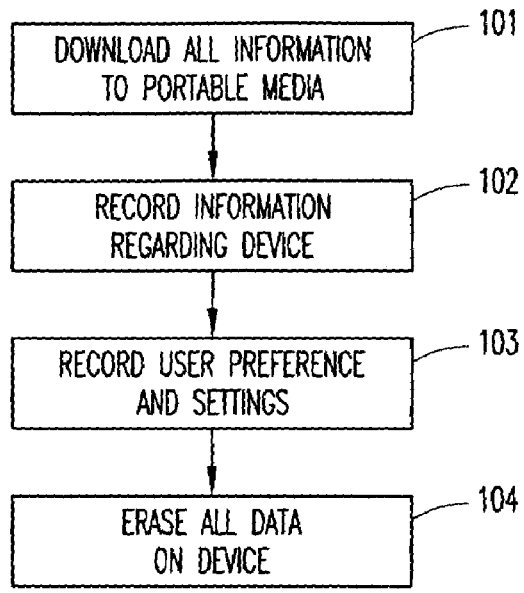
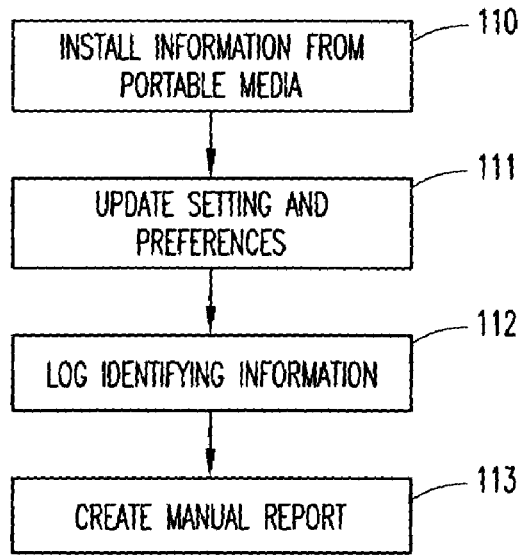
FIG. 1

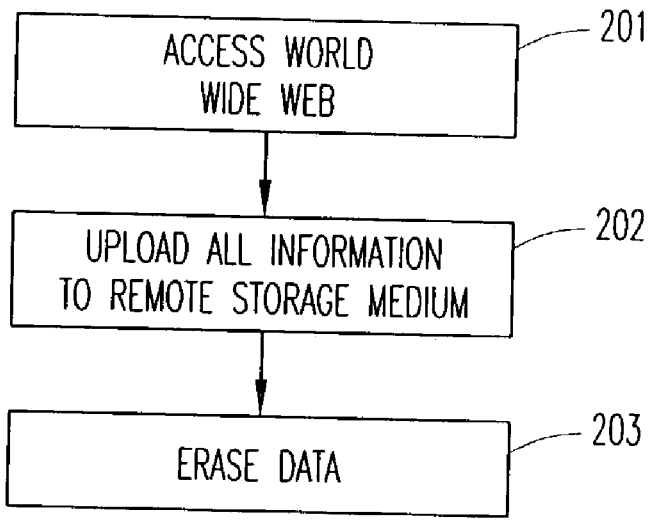
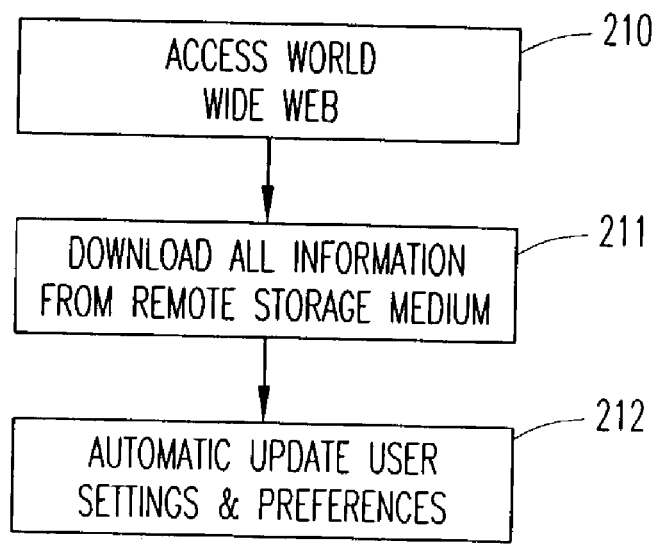
FIG. 2

File  Edit  View  Go  Favorites  Help

Address [http://

BCI Home | User Survey | Site Survey

Site Info | Logistics | Infrastructure | Software | Resources | Site Codes | Activities

Site Survey - Logistics for Abbeville

1) Site Contact name and phone number Please

2) Predominant spoken language at this site: [English ▼]

3) Name and phone number of representative who performed the survey.

4) Work hours (times and time zone):

a. Normal Business hours (M-F)

b. Operational/Manufacturing Hours (e.g. 5x24, 7x24, etc.)

c. Hours available for personnel (from/to)

d. Security access requirements for vendor personnel:

5) Site dress code [Business Casual ▼]

6) Site Safety Clothing and Equipment Requirements (please identify below each item whether Unisys workers need to provide for themselves).

a. Hard Hats [No ▼]

b. Hard Sole, leather Shoes [No ▼]

WEB-BASED ASSET MANAGEMENT

CROSS-REFERENCES TO RELATED APPLICATIONS

This non-provisional application is a Continuation of Patent Application having Ser. No. 10/321,115 filed on Dec. 17, 2002, now U.S. Pat. No. 6,636,857, and further claims priority based upon prior U.S. Provisional Patent Application Ser. No. 60/342,031 filed Dec. 18, 2001 in the names of Shawn Thomas, Gregory Gray, Michael Woodfin, Warner Mizell and Brian Thomas, entitled "Method and System for Deploying, Tracking and Managing Technology-Related Resources."

BACKGROUND

Existing systems and methods exist for replacing old computer-related assets. Typically, a computer technician would access the existing asset and make either handwritten notes of the user's setting and preferences or input the information into a computer and save it to a diskette. The technician would then download the information on the device's drive onto a portable medium. This process can take a considerable amount of time, is prone to technician error and results in a high labor cost due to the higher rates paid to computer technicians over general office laborers.

Existing methods are further limited because the information that is collected is not collected in such a manner that it can be compiled, managed and updated in the future. Under existing methods, once the computer technician re-installs the information on a new machine, he destroys any records that he may have kept relating, for example, to the specific versions of software installed, the serial number of the computer on which it was installed or the date of installation and, if the information is saved, it is usually not accessible in an organized, easily-accessible manner. Consequently, when the new machine is ready to be upgraded, relocated or decommissioned, the computer technician must start anew to gather information about it and the user's settings and preferences.

There is a need, therefore, for an improved method and system for replacing, implementing and managing computer-related assets.

SUMMARY

Various embodiments provide a method and system for replacing, implementing and managing computer-related assets. Embodiments provide a method of asset management in which a technician accesses the World Wide Web through a user's computer. The information resident on the computer, including information regarding the computer and the user's preferences, is downloaded to a remote storage medium through the World Wide Web. Once the information is downloaded, all information may be removed from the user's computer. Subsequently, the technician accesses another computer such as, for example, a new computer that has been assigned to the same user. The technician accesses the World Wide Web through the new computer and downloads the information previously stored on the remote storage medium. This information can then be used to install the user's prior applications, settings and preferences on the new computer.

Embodiments provide a method for asset management in which information that is downloaded from a user's computer at the time that a computer is installed or relocated is retained in a centralized database. Thereafter, the information can be accessed, modified and updated throughout the life of the computer.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 1 is a flow diagram of a typical asset deployment workflow process;

FIG. 2 is a workflow diagram showing the preferred method for asset management according to the present invention;

FIG. 4 is a typical screen display used in the preferred method for asset management showing how a technician is prompted for location information;

FIG. 5 is a typical screen display used in the preferred method for asset management showing how a technician is prompted for user information;

FIG. 6 is a typical screen display used in the preferred method for asset management showing how a technician is prompted for legacy asset information;

DETAILED DESCRIPTION

Figure 3:
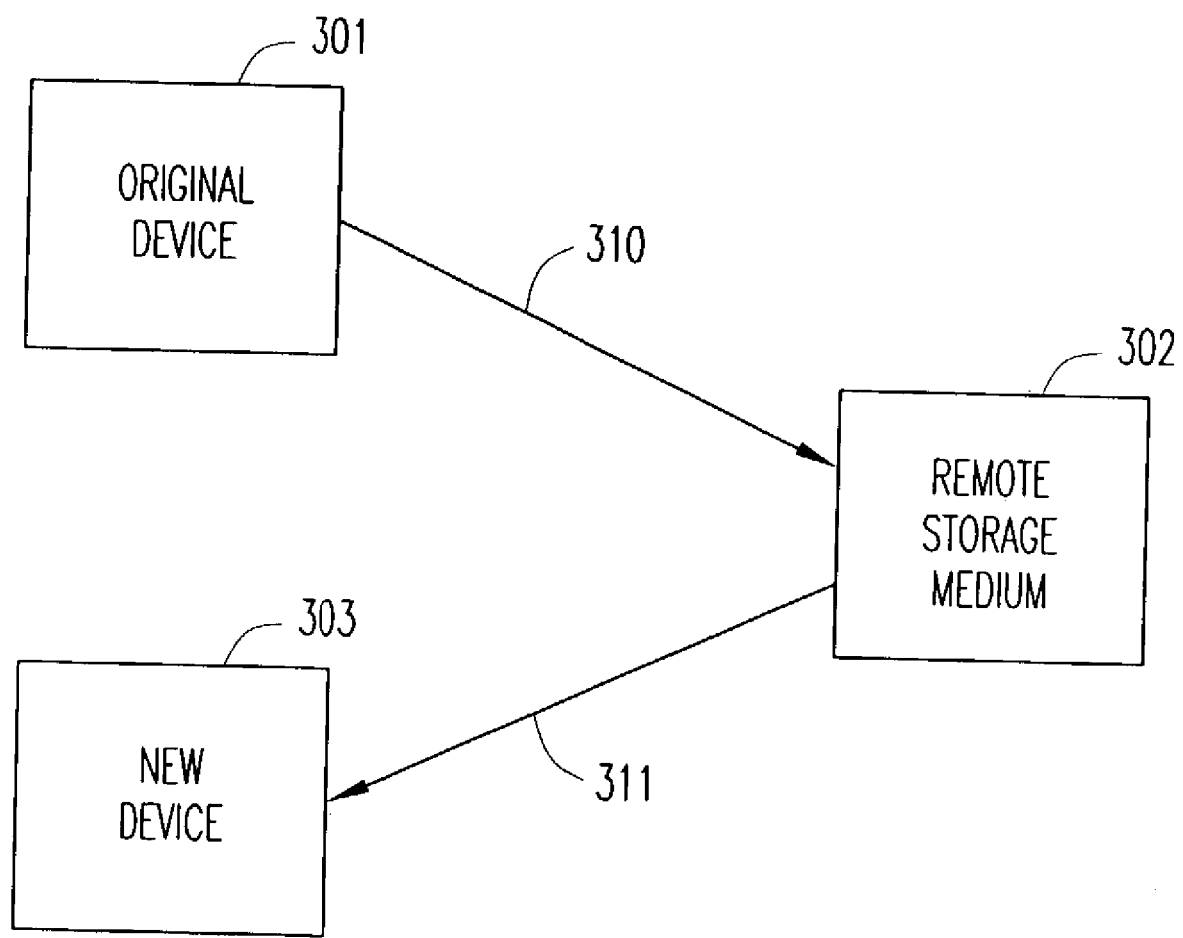
FIG. 3 is a system diagram showing the preferred system for asset management.

The numerous innovative teachings of the present application will be described with particular reference to the present embodiments. However, it should be understood that these embodiments provide only a few examples of the many advantageous uses of the innovative teachings herein. In general, statements made in the specification of the present application do not necessarily delimit any of the various claimed embodiments. Moreover, some statements may apply to some inventive features, but not to others.

A typical asset deployment work flow is illustrated in FIG. 1. Typically, a technician would begin by accessing the original computer-related hardware device. He would download all data to portable media 101. For example, the technician may download all data to a CD-ROM, tape drive or another attached portable hard drive. Thereafter, the technician would perform a visual inspection of the device and record information concerning the device 102 obtained, including such information as the software applications installed on the machine, the serial number of the machine, the hardware attached to the machine, and other information concerning the type and nature of the user's equipment. The technician will next record user preferences and settings 103. This information may include the user's bookmarks, recorded passwords, and other information specific to the individual user. Once the information has been obtained and recorded, the technician will proceed to erase all data on the device 104. The original device is then ready for disposition.

Either the same or a new technician will be responsible for installing the user's information on a new device. Once again referring to FIG. 1, the technician will begin by installing the information on the device from the portable media 110. Once the information has been installed, the technician will proceed to update the user's settings and preferences 111. The technician will then inspect the device to determine identifying information 112 such as the device's serial number and the software installed. Thereafter, the technician will create a manual report 113 of all activities related to the user's devices. The process undertaken by the technician is cumbersome due to the slow speeds at which data is transferred from the device to the portable media. In addition, the process is costly because an experienced computer technician is needed to transfer the files and update the user's settings and preferences. Moreover, there is a risk that the information stored on the portable media may be lost while being transported.

A method for asset management is shown in FIG. 2. The work flow is a highly generalized overview of non-industry specific deployment and does not take into account such activities as future asset management, integration of disparate systems, data assimilation and the like, all of which may be performed as part of this invention. The method commences when a technician accesses the World Wide Web 201 through the user's computer-related hardware device such as a desktop computer, laptop computer, hand-held computer, printer, scanner, networking device or storage device. The technician can access the World Wide Web 201 through the internet, a local area network, or other methods known in the art. Once the technician has access to the World Wide Web, he proceeds to upload all information from the device to a remote storage medium 202. The information may be transferred through a secure, encrypted transmission so as to protect the confidentiality of the information. Additionally, the information may be converted to formatted data files prior to transmission for ease of storage and transfer. The information transferred contains information regarding the user's preferences and settings and the user's overall equipment configuration. Once the information has been uploaded by the technician, the technician can erase all data 203 residing on the device. The device may then be disposed of without further activity.

The same or a new technician can then install the information on the new device. The technician will proceed by first accessing the World Wide Web 210 to access the remote storage medium on which the user's information is stored. The information may be stored on the remote storage medium in a database, such as a relational database. In addition, the technician will next download all information relating to the user from the remote storage medium 211. This process may include, for example, a filter so that unwanted or redundant files will not be transferred. Once the information has been downloaded to the new device the system can automatically update user settings and preferences 212.

The improved process described in FIG. 2 has a number of advantages over the prior art. For example, the transfer of information occurs rapidly so that the transfer of data to the new device can occur on a real time basis. In addition, because the information is held in electronic form, a wide variety of reports can be generated relating to the information resident on the user's computer. Also, because software is being installed electronically, a means exists for monitoring, updating and controlling versions of software resident on the device. Another benefit is the ability to translate information being transmitted between devices into a common language.

It will be understood by those skilled in the art that certain information regarding a user's settings, preferences or equipment may not be included within the information transmitted to the remote storage medium and therefore may not be available to update the new device. In such cases, it is anticipated that, as part of the present invention, a combination of the foregoing Web-based asset management and traditional techniques for updating user's settings, preferences and equipment list would be used. For example, when information is downloaded from the remote storage medium 211, a method may be employed whereby the device assesses what information it requires has not been downloaded. Thereafter, the device would be programmed to prompt the user to provide such information.

A system for Web-based asset management is shown in FIG. 3. The system preferably comprises an original device 301, a remote storage medium 302 and a new device 303. The original device 301 and the new device 303 both have access to the World Wide Web. The system described herein provides a means for transferring information from the original device through the World Wide Web to a remote storage medium 310. In addition, the system provides a means 311 for transferring information from the remote storage medium to a new device through the World Wide Web. As has been previously described, the transfer of information from the original device through the remote storage medium to the new device is completed once the user's preferences and profile settings have been completed.

FIG. 4 depicts a meeting display showing how a technician may be prompted to input information regarding the location in which the equipment exists. Basic information is included on the form such as, for example, site contact and phone number, language predominantly spoken at the site, and the name of the representative who performed the survey. The input of this information provides a valuable resource within the overall method and system because future users can refer back to the information when subsequent visits are planned.

Figure 5:
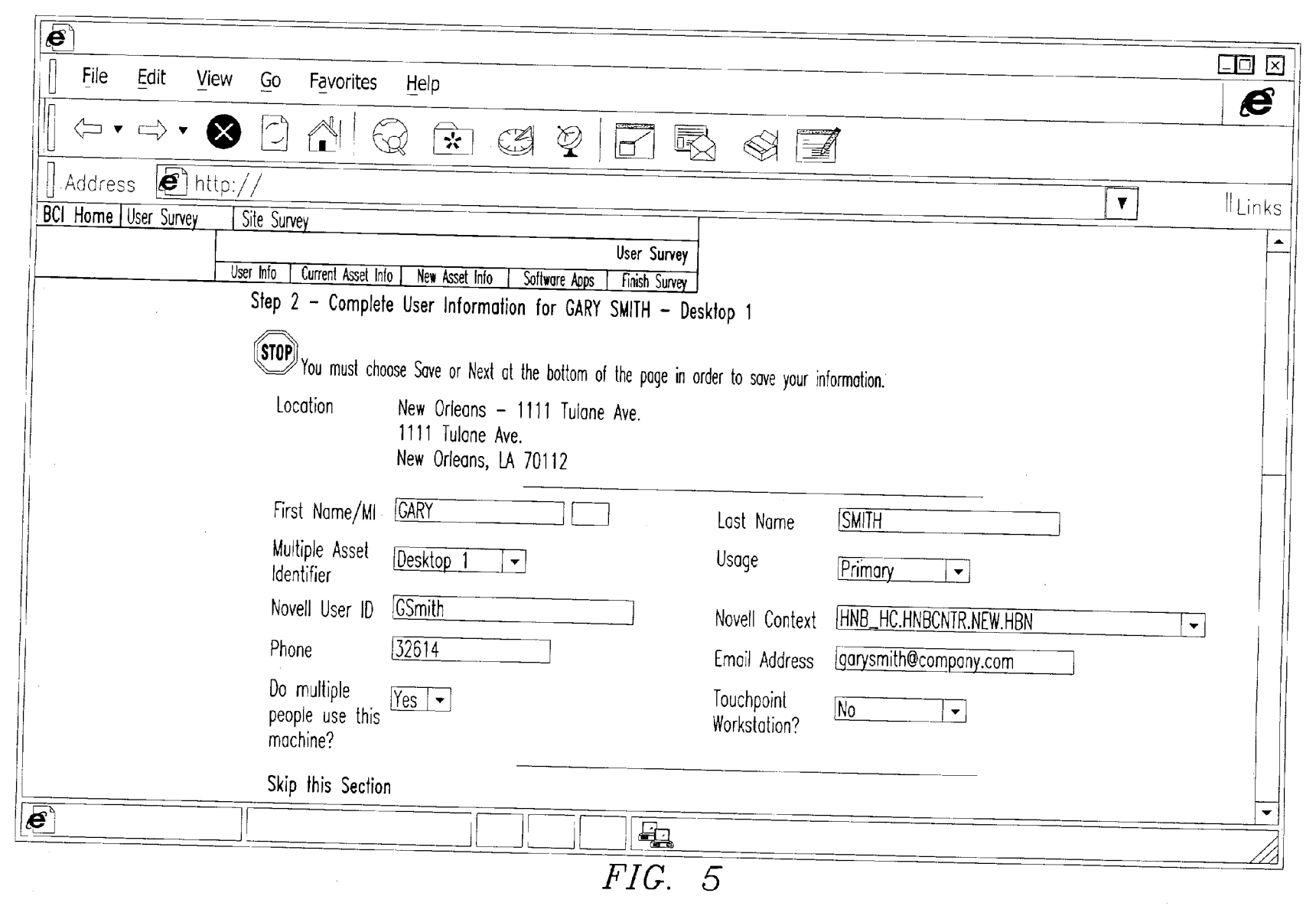

FIG. 5 presents a screen display showing how a technician may be prompted to input information regarding the device's user. The information to be input will include such information as first name, last name, user ID and email address. This information can be used by the system for validating the user's name and access authority.

Figure 6:
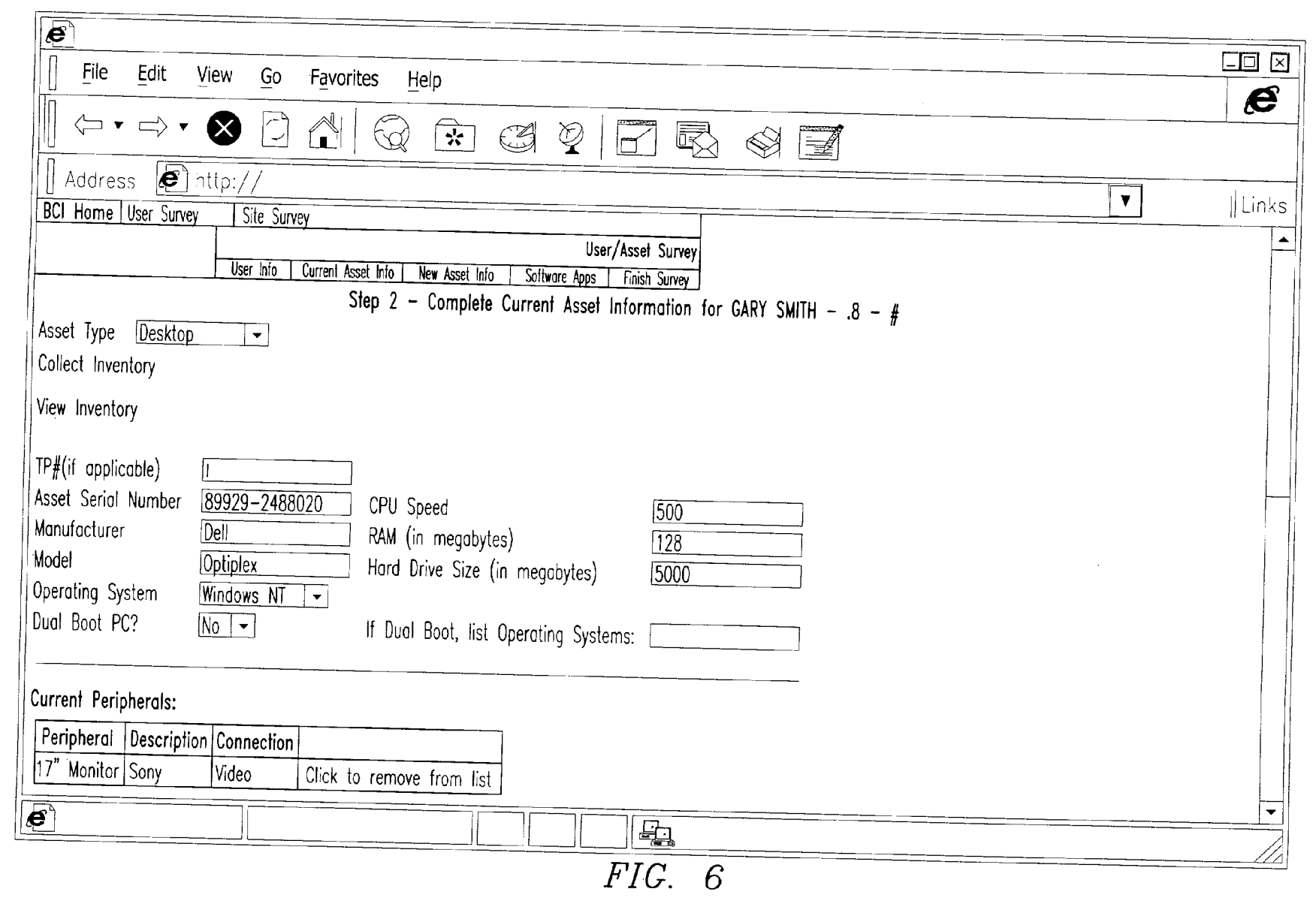

FIG. 6 depicts a screen display that may be accessed by the technician for the purpose of inputting legacy asset information. The screen display prompts the technician to input such information as the asset type, manufacturer, model, serial number and peripherals. This information is critical to the system for the future configuration of the user's devices.

Figure 7:
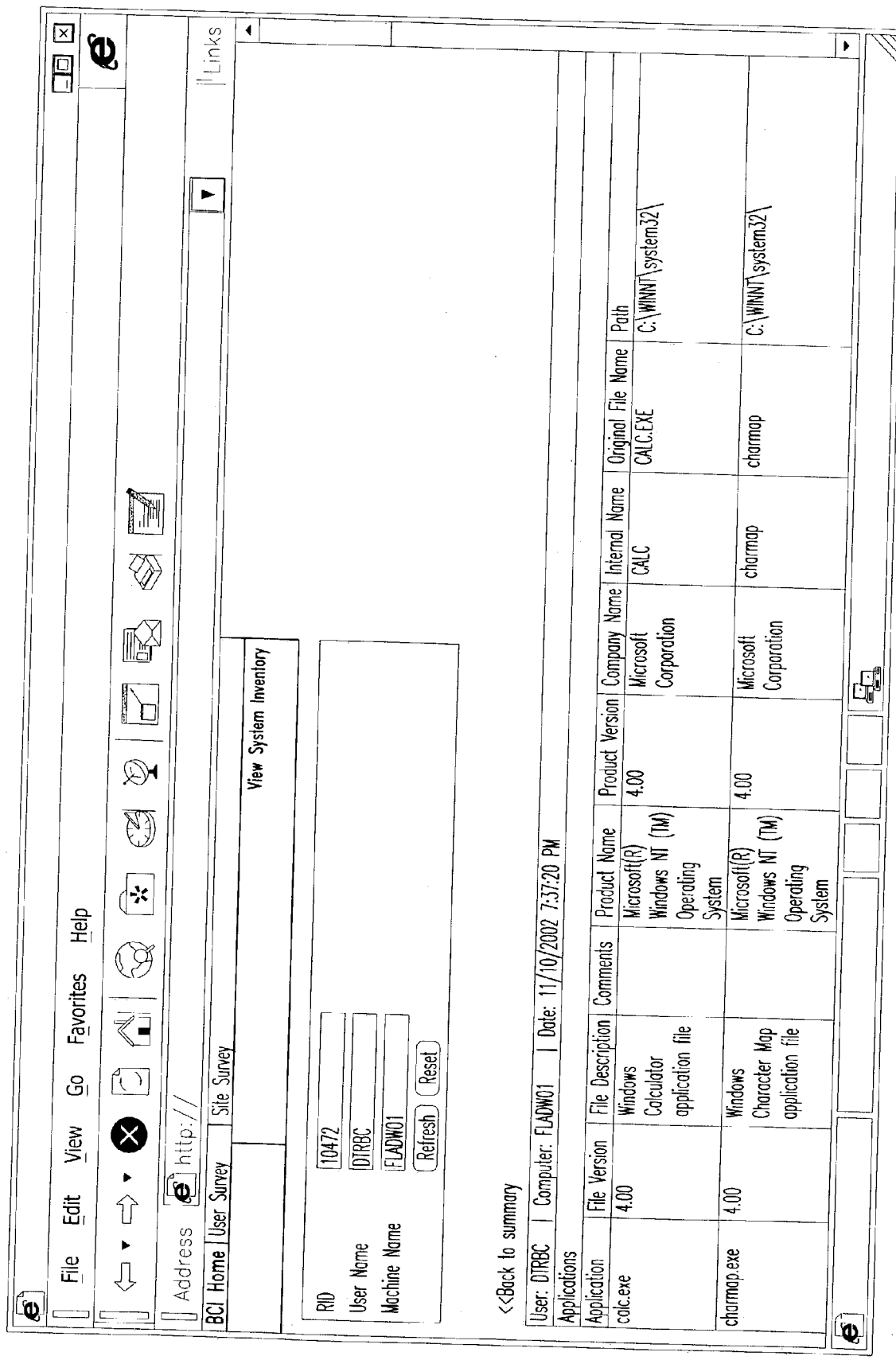
FIG. 7 is a typical screen display used in the preferred method for asset management showing how a technician is prompted for application information.

FIG. 7 shows a screen display that may be used to prompt a technician to input information regarding the existing applications on a user's device. The display will first prompt a technician to input a user name and the machine name. The program will then automatically discover the applications on the device, a procedure which is known in the art. Once the information is obtained, it is combined with the user name and machine name previously entered.

Figure 8:
FIG. 8 is a typical screen display used in the preferred method for asset management showing how a technician is prompted for new asset information.

FIG. 8 provides a depiction of a screen display in which a technician may be prompted to input information regarding the new asset. Information that may be requested includes the scheduled installation date, the new asset source, the new work station type and the location of the new asset.

We claim:

1. A computer-implemented method comprising:
   accessing the Internet with a first computer-related hardware device which is being replaced in an asset transition;
   transferring information from the first computer-related hardware device over the Internet to be stored at a remote storage device,
   wherein the information is configured to enable a second computer-related hardware device to automatically update the second computer-related hardware device with settings and preferences of the first computer-related hardware device using the information;
   determining that automatically updating the second computer-related hardware device involves additional information; and requesting display of an interface configured to facilitate reception of the additional information.

2. The computer-implemented method of claim 1, wherein transferring the information comprises transferring information that is encrypted.

3. The computer-implemented method of claim 1, wherein the information includes the first computer-related hardware device's equipment configuration.

4. The computer-implemented method of claim 1, further comprising filtering the information to remove unwanted or redundant information prior to transferring the information.

5. A computer-implemented method comprising:
  accessing the Internet with a replacement computer-related hardware device which is to replace a replaceable computer-related hardware device in an asset transition;
  receiving information from a remote storage device, wherein the information includes customized preferences and settings of the replaceable computer-related hardware device received at the remote storage device from the replaceable computer-related hardware device;
  automatically updating the replacement computer-related hardware device with at least some of the customized preferences and settings of the replaceable computer-related hardware device using the received information;
  determining that automatically updating the replacement computer-related hardware device involves additional information; and
  requesting display of an interface configured to facilitate reception of the additional information.

6. The computer-implemented method of claim 5, wherein the information further comprises the replaceable computer-related hardware device's equipment configuration.

7. The computer-implemented method of claim 5, wherein receiving information from a remote storage device comprises downloading the information from the remote storage device via an interface generated by a web browser on the replacement computer-related hardware device.

8. The computer-implemented method of claim 5, wherein receiving the information comprises downloading the information from the remote storage device with an electronic discovery application.

9. A tangible computer-readable storage medium having stored thereon, software, that in response to execution by a replacement computer-related hardware device, causes the replacement computer-related hardware device to perform a method comprising:
  accessing the Internet with the replacement computer-related hardware device which is to replace a replaceable computer-related hardware device in an asset transition;
  receiving information from a remote storage device, wherein the information includes customized preferences and settings of the replaceable computer-related hardware device received at the remote storage device from the replaceable computer-related hardware device;
  automatically updating the replacement computer-related hardware device with at least some of the customized preferences and settings of the replaceable computer-related hardware device using the received information;
  determining that automatically updating the replacement computer-related hardware device involves additional information; and
  requesting display of an interface configured to facilitate reception of the additional information.

10. The tangible computer-readable storage medium of claim 9, wherein the software if executed by the replacement computer-related hardware device, causes the replacement computer-related hardware device to perform a method further comprising:
  causing display of an interface configured to receive legacy asset information associated with the replacement computer-related hardware device.

11. The tangible computer-readable storage medium of claim 9, wherein the information further comprises the replaceable computer-related hardware device's equipment configuration.

12. The tangible computer-readable storage medium of claim 9, wherein receiving information from a remote storage device comprises downloading the information from the remote storage device via an interface generated by a web browser on the replacement computer-related hardware device.

13. The tangible computer-readable storage medium of claim 9, wherein receiving the information comprises downloading the information from the remote storage device with an electronic discovery application.

* * * * *

UNITED STATES PATENT AND TRADEMARK OFFICE
CERTIFICATE OF CORRECTION

| | | |
|---|---|---|
| PATENT NO. | : 7,765,181 B2 | Page 1 of 1 |
| APPLICATION NO. | : 10/464176 | |
| DATED | : July 27, 2010 | |
| INVENTOR(S) | : Shawn Thomas et al. | |

It is certified that error appears in the above-identified patent and that said Letters Patent is hereby corrected as shown below:

On page 2, under "U.S. PATENT DOCUMENTS", in column 1, line 10, insert -- 5,643,112 A 7/1997 Besnard et al. --

On page 2, under "U.S. PATENT DOCUMENTS", in column 1, line 23, insert -- 5,878,234 A 3/1999 Dutkiewicz et al. --

Signed and Sealed this
Thirty-first Day of May, 2011

David J. Kappos
*Director of the United States Patent and Trademark Office*